(12) United States Patent
Suda et al.

(10) Patent No.: US 8,522,856 B2
(45) Date of Patent: Sep. 3, 2013

(54) METHOD OF MANUFACTURING OPTICAL COMPONENT

(75) Inventors: Nobuyuki Suda, Sagamihara (JP); Seiji Isogawa, Tokyo (JP); Yukichi Hanayama, Tokyo (JP); Takeo Suzuki, Tokyo (JP); Hiroaki Negishi, Tokyo (JP); Noriko Negishi, legal representative, Tokyo (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 13/227,998

(22) Filed: Sep. 8, 2011

(65) Prior Publication Data
US 2012/0049394 A1 Mar. 1, 2012

Related U.S. Application Data

(63) Continuation of application No. PCT/JP2010/001660, filed on Mar. 9, 2010.

(30) Foreign Application Priority Data

Mar. 9, 2009 (JP) ................................. 2009-055550

(51) Int. Cl.
*B22D 19/00* (2006.01)
*B29D 11/00* (2006.01)

(52) U.S. Cl.
USPC .............................. 164/98; 164/137; 264/1.7

(58) Field of Classification Search
USPC ............... 164/47, 91, 98, 137; 264/1.1, 1.21, 264/1.7, 2.5; 65/36, 37
See application file for complete search history.

(56) References Cited

U.S. PATENT DOCUMENTS

2007/0070589 A1* 3/2007 Chen et al. .................... 361/681

FOREIGN PATENT DOCUMENTS

| JP | 59-068710 A | 4/1984 |
| JP | 06-115950 A | 4/1994 |
| JP | 08-201672 A | 8/1996 |
| JP | 11-207788 A | 8/1999 |
| JP | 2011-101385 A | 5/2001 |
| JP | 2001-262292 A | 9/2001 |
| JP | 2003-295028 A | 10/2003 |
| JP | 2004-103170 A | 4/2004 |
| JP | 2004-147032 A | 5/2004 |

(Continued)

OTHER PUBLICATIONS

International Search Report issued for PCT/JP2010/001660, dated Jun. 29, 2010.

(Continued)

*Primary Examiner* — Mathieu D. Vargot
(74) *Attorney, Agent, or Firm* — Dickstein Shapiro LLP

(57) ABSTRACT

A method of manufacturing an optical component that is provided with an optical element, and an optical element holding component that holds an outer circumferential portion of the optical element includes: placing the optical element on an interior side of a metal die that molds the optical element holding component, and in which an incident side protective component that protects an optical surface on an incident side of the optical element is placed against this optical surface on the incident side, and placing an emission side protective component that protects an optical surface on an emission side of the optical element against this optical surface on the emission side; and filling the interior of the metal die with a molten metal material so that the optical element holding component which is formed from an amorphous alloy is injection molded integrally with the optical element.

3 Claims, 4 Drawing Sheets

(56) References Cited

FOREIGN PATENT DOCUMENTS

| | | |
|---|---|---|
| JP | 2004-148525 A | 5/2004 |
| JP | 2006-075341 A | 3/2006 |
| JP | 2006-122498 A | 5/2006 |
| JP | 2006-145652 A | 6/2006 |
| JP | 2007-022905 A | 2/2007 |
| JP | 2007-140401 A | 6/2007 |
| JP | 2007-313767 A | 12/2007 |
| JP | 2008-049134 A | 3/2008 |
| JP | 2008-170992 A | 7/2008 |
| JP | 2009-037162 A | 2/2009 |

OTHER PUBLICATIONS

Japanese Office Action issued for JP 2009-055550, mailing date Nov. 20, 2012 (with English translation).

* cited by examiner

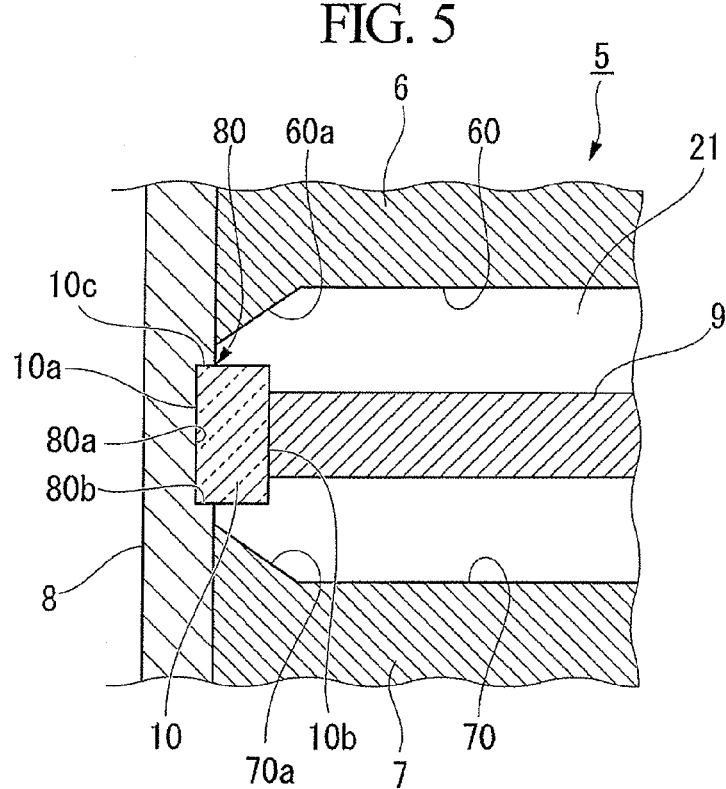
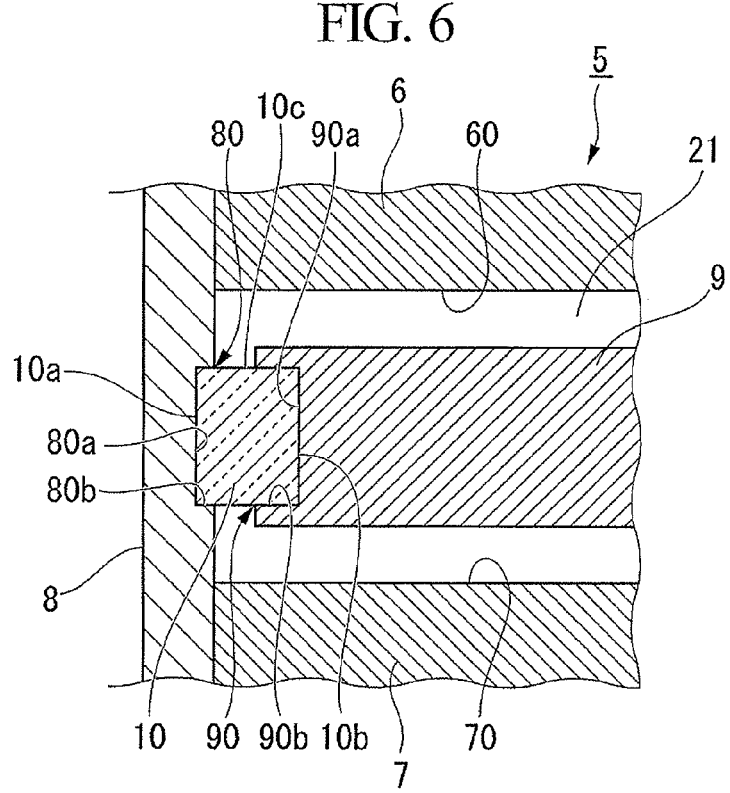

METHOD OF MANUFACTURING OPTICAL COMPONENT

The present application claims priority on Japanese Patent Application No. 2009-55550, filed Mar. 9, 2009, and is a continuation application based on International Application PCT/JP 2010/001660, filed Mar. 9, 2010 the contents of which are incorporated herein by reference.

BACKGROUND OF THE INVENTION

1. Field of the Invention

The present invention relates to a method of manufacturing an optical component that is provided with an optical element and an optical element holding component that holds this optical element.

2. Description of Related Art

Generally, lenses (i.e., optical elements) that are used in optical instruments such as endoscopes and cameras are fixed to the optical instrument via a lens case (i.e., an optical element holding component). These lens cases which are used to fix a lens in position are conventionally manufactured using resin materials or metal materials.

Lens cases that use resin materials make use of the superior moldability of resin, and are manufactured via an injection molding process. They have the advantage of having superior productivity compared with lens cases that use metal materials. The lens case for an endoscope described, for example, in Japanese Patent Application, First Publication No. 2006-122498 is known as a lens case which uses this type of resin material.

Lens cases that use metal materials are manufactured via a cutting process or a die-cast process, and have the advantage of having superior strength and durability compared to lens cases that use resin materials. The lens case for an endoscope described, for example, in Japanese Patent Application, First Publication No. 2006-075341 is known as a lens case which uses a metal material.

Moreover, the lens cases for cameras described, for example, in Japanese Patent Application Laid-Open Nos. 2004-148525, 2007-140401, and 2004-147032 are known as lens cases which use a resin material or a metal material.

SUMMARY OF THE INVENTION

The method of manufacturing an optical component according to the present application is a method of manufacturing an optical component that is provided with an optical element, and an optical element holding component that holds an outer circumferential portion of the optical element, that includes: a step in which the optical element is placed on an interior side of a metal die that molds the optical element holding component, and in which an incident side protective component that protects an optical surface on an incident side of the optical element is placed against this optical surface on the incident side, and an emission side protective component that protects an optical surface on an emission side of the optical element is placed against this optical surface on the emission side; and a step in which the interior of the metal die is filled with a molten metal material so that the optical element holding component which is formed from an amorphous alloy is injection molded integrally with the optical element.

As a consequence of these features, the making of the shape of the optical element holding component and the fixing of the optical element to this optical element holding component are performed simultaneously.

When an optical element and an optical element holding component are formed as a single unit by means of injection molding, because the molten metal material which is at a high temperature is in contact with the optical element, the temperature of the optical element is raised, and subsequently the metal material is cooled by the metal die so as to form an optical element holding component formed from an amorphous alloy. At this time, in some cases the cooling speed of the metal material is rapid and the stress relaxation of the optical element is insufficient. In such cases, residual stress is generated within the optical element, and there is a possibility that the optical characteristics of the optical element will be changed or that the optical element will break.

In contrast, in the method of manufacturing an optical element according to the above described application, the incident side protective component and the emission side protective component not only protect the optical surface of the optical element from molten material, but because they allow heat from the optical element to pass through themselves and escape to the outside of the metal die, any rise in the temperature of the optical element is kept in check, and the occurrence of deformation and residual stress in the optical element are inhibited.

In the method of manufacturing an optical element of the present application, it is preferable for a portion of the inner circumferential surface of the metal die that faces the outer circumferential surface of the optical element to have a narrow diameter, and for a portion of the optical element holding component that holds the optical element to be formed thinner than a cavity portion of the optical element holding component.

By employing this type of structure, because the volume of the molten material filling the outer circumference of the optical element (i.e., the portion of the optical element holding component that holds the optical element) is reduced, the amount of heat that is transmitted to the optical element from the molten material is reduced, so that any temperature increase in the optical element is further suppressed, and the occurrence of deformation and residual stress in the optical element are suppressed even further.

Moreover, in the method of manufacturing an optical element of the present application, it is preferable for at least one of the incident side protective component and the emission side protective component to be placed against the optical surface of the optical element so as to protect this optical surface, and to be also placed against a portion of the outer circumferential surface of the optical element so as to protect the portion of the outer circumferential surface of this optical element.

By employing this type of structure, because the surface area of the portion of the outer circumferential surface of the optical element that makes contact with the molten material (i.e., the portion of the optical element holding component that holds the optical element) is reduced, the amount of heat transmitted from the molten material to the lens is reduced, and any rise in the temperature of the optical element is suppressed even further so that the occurrence of residual stress as well as any deformation of the optical element are even more inhibited.

BRIEF DESCRIPTION OF THE DRAWINGS

FIG. 5 is a vertical cross-sectional view of a core portion of a metal die in order to illustrate a second embodiment of the present invention.

FIG. 6 is a vertical cross-sectional view of a core portion of a metal die in order to illustrate a third embodiment of the present invention.

DETAILED DESCRIPTION OF THE INVENTION

The optical component of the present invention is a component which is mounted in an optical instrument such as an endoscope, a microscope, or a camera or the like, and is provided with an optical element, and an optical element holding component that holds this optical element. A glass lens is one example of this type of optical element. Moreover, lens cases and spacer tubes that can be mounted on the optical instrument are examples of this type of optical element holding component.

Hereinafter, a first through third embodiment of the method of manufacturing an optical component according to the present invention will be described based on the drawings.

First Embodiment

Firstly, a first embodiment of the present invention will be described based on FIG. 1 through FIG. 4.

Figure 1:
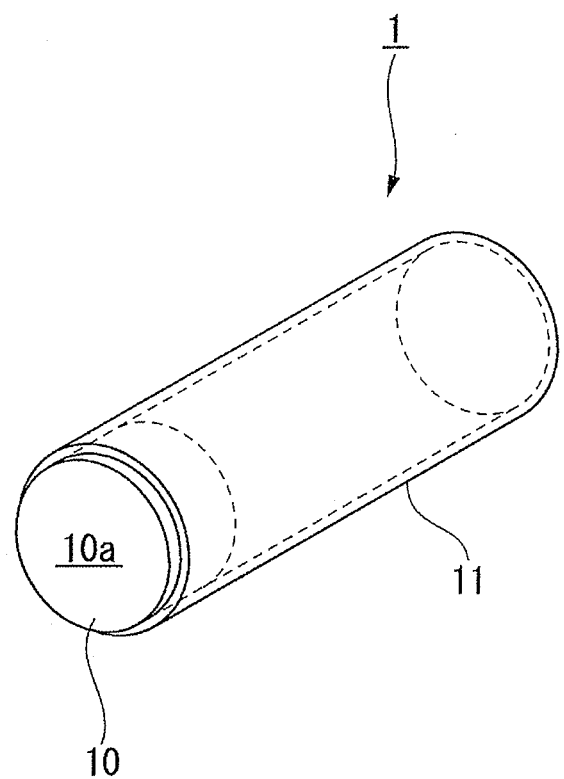
FIG. 1 is a perspective view of an optical component in order to illustrate a first embodiment of the present invention.
Figure 2:
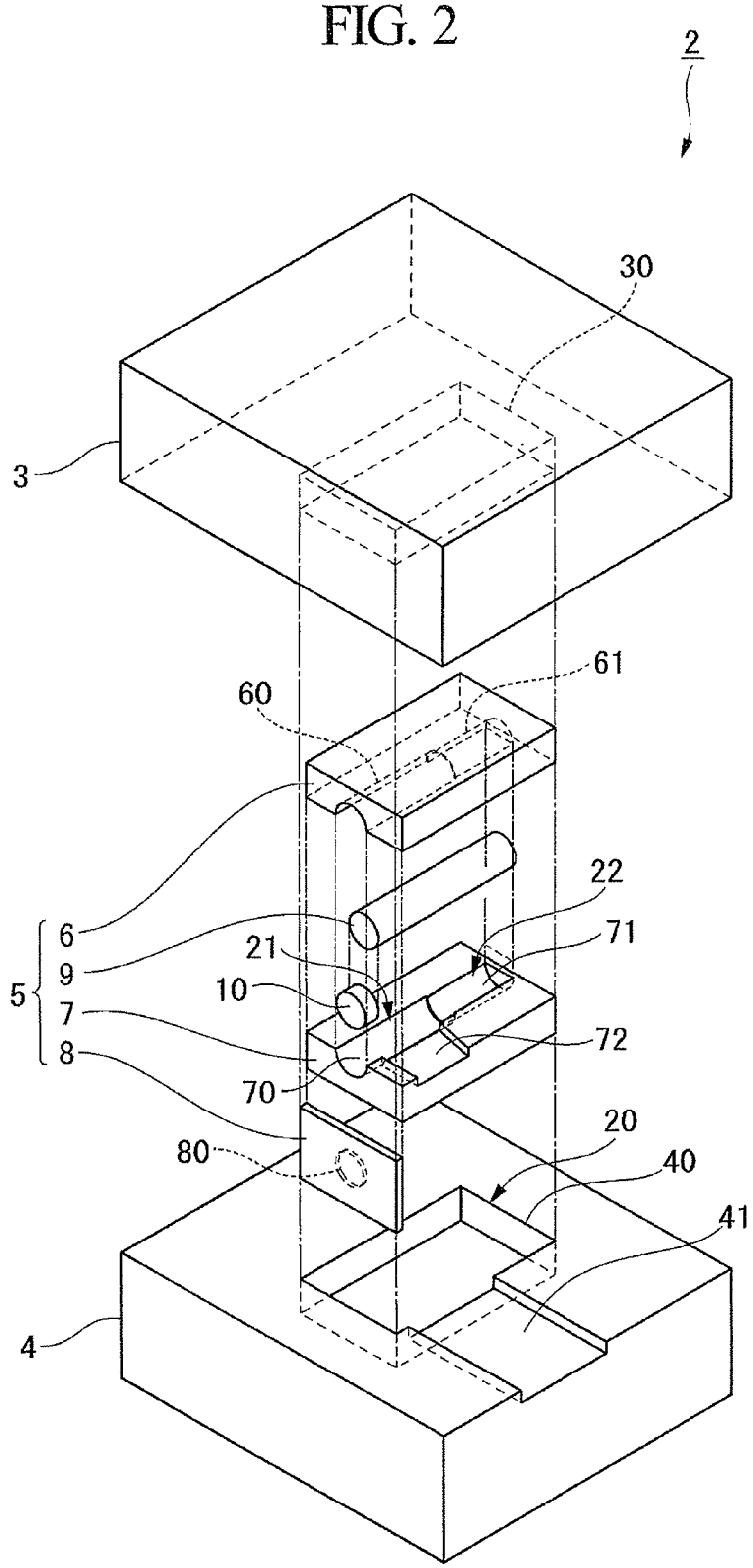
FIG. 2 is an exploded perspective view of a metal die in order to illustrate a first embodiment of the present invention.
Figure 3:
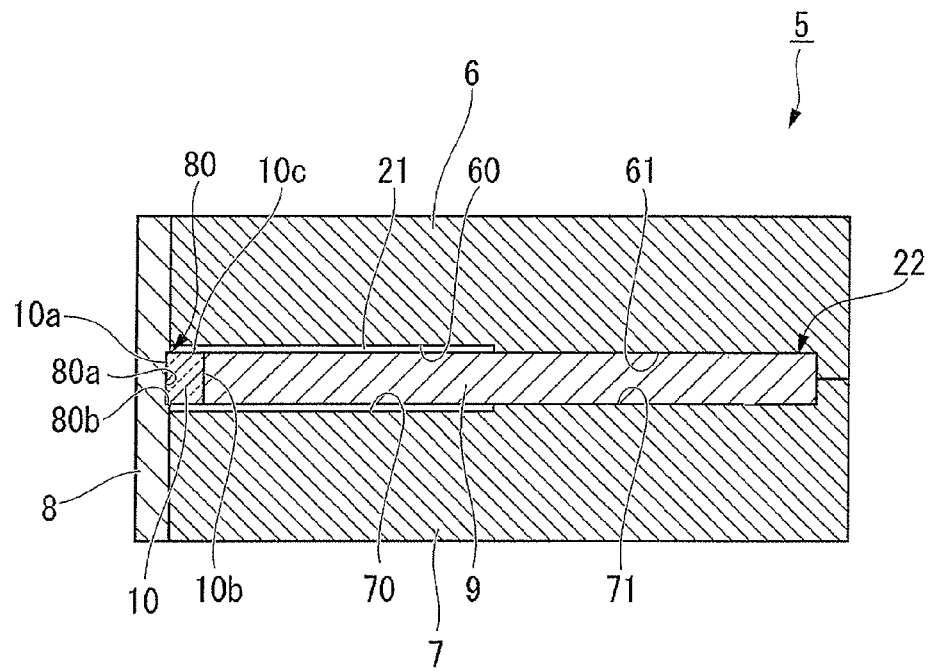
FIG. 3 is a vertical cross-sectional view of a core portion of a metal die in order to illustrate a first embodiment of the present invention.
Figure 4:
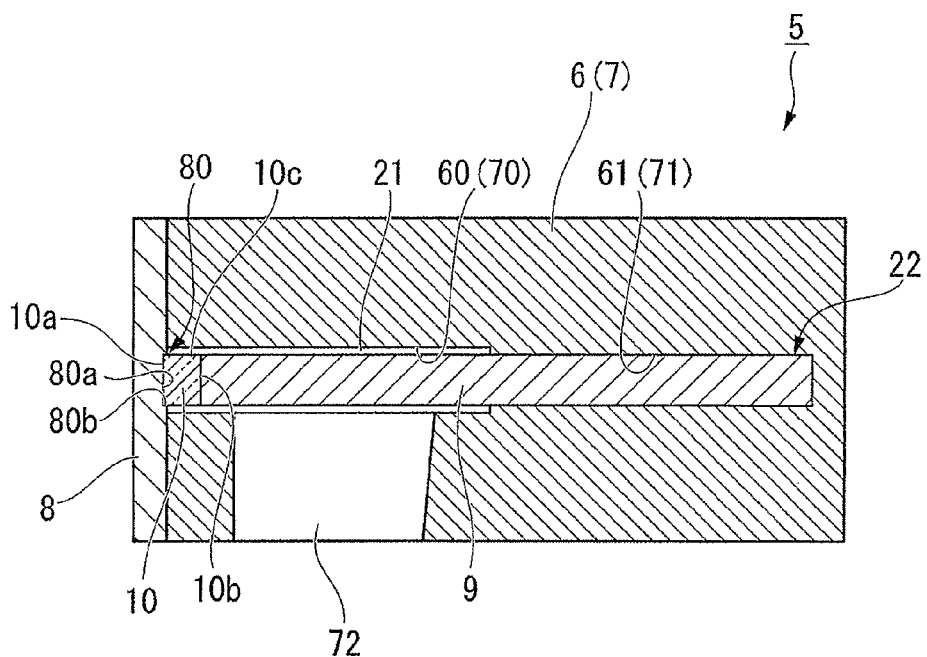
FIG. 4 is a horizontal cross-sectional view of a core portion of a metal die in order to illustrate a first embodiment of the present invention.

FIG. 1 is a perspective view of an optical component 1 for an endoscope (corresponding to the optical component of the present invention). FIG. 2 is an exploded perspective view of a metal die 2 that is used to manufacture the optical component 1 for an endoscope. FIG. 3 is a vertical cross-sectional view showing an enlargement of a core portion 5 of the metal die 2. FIG. 4 is a horizontal cross-sectional view showing an enlargement of a core portion 5 of the metal die 2.

Note that in the embodiment described below, the distal end side of the endoscope in the axial direction of the endoscope optical component 1 (i.e., the left side in FIG. 3) is described as the 'distal end side', while the opposite side from this (i.e., the right side in FIG. 3) is described as the 'base end side'.

Firstly, the endoscope optical component 1 will be described.

As is shown in FIG. 1, the endoscope optical component 1 is an optical component which is used as objective lens unit (i.e., an imaging optical system) and illumination unit and is mounted on the distal end of an insertion portion of an endoscope (not shown), and the fundamental structure thereof is made up of a lens 10, and a circular cylinder-shaped lens case 11 that holds outer circumferential portions of the lens 10.

The lens 10 is disposed on an inner side of a distal end portion of the lens case 11. A distal end portion of the lens 10 protrudes from an end portion of the lens case 11. Note that a commonly known lens can be used as the lens 10, and the type and configuration of the lens 10 can be altered as is appropriate.

The lens case 11 is a molded part that is molded by injection filling a molten metal material into the metal die 2 shown in FIG. 2, and forms an amorphous alloy after the molding. An amorphous alloy is an alloy in which a plurality of metallic elements solidify (i.e., become amorphous) without forming a crystal structure. An amorphous alloy is formed by rapidly cooling a molten metal material that is formed from a plurality of metallic elements to equal to or less than its glass transition temperature. Amorphous alloys do not have grain boundaries such as those seen in normal crystalline metals, and have superior corrosion resistance due to the fact that intergranular corrosion (which is a phenomenon in which corrosion progresses along grain boundaries) attributable to the grain boundaries does not occur.

Metallic glass is one example of an amorphous alloy for molding the lens case 11. Metallic glass is an amorphous alloy whose glass transition region (i.e., a value obtained by subtracting the glass transition temperature from the crystallization temperature) is 20° C./sec or more. The features of metallic glass are that because solidification shrinkage such as that occurring in crystalline metals does not occur in metallic glass, its transferability to a molding metal die is extremely accurate and it can also be injection molded. Consequently, metallic glass has superior freedom in the shape of the molded article, superior dimensional accuracy, and superior productivity. Moreover, the physical properties of metallic glass are that it has a low Young's modulus and is extremely strong, and it also has a low level of expansion in response to heat. Metal materials for forming this type of metallic glass include Zr (zirconium)-based alloys, Fe (iron)-based alloys, Ti (titanium)-based alloys, and Mg (magnesium)-based alloys and the like. Among these, Zr-based alloys are examples of a metal material that has particularly low expansion and dimensional accuracy. As a specific example of a Zr-based alloy, an alloy having a composition of $Zr_{55}Cu_{30}Al_{10}Ni_5$, a crystallization temperature of approximately 490° C., a glass transition temperature of approximately 400° C., and a glass transition region of approximately 90° C. can be used. The coefficient of thermal expansion of this metallic glass (i.e., a Zr-based alloy) is $10^{-6}$/K.

The metal die 2 and the like used for the injection molding of the above-described lens case 11 will now be described.

As is shown in FIG. 2, the metal die 2 is a component that is used to mold the lens case 11, and has a separable structure. More specifically, the metal die 2 is provided with a top die seat 3, a bottom die seat 4, and a core portion 5.

The top die seat 3 and the bottom die seat 4 are block-shaped steel components that are able to be vertically superimposed, and a bottom surface of the top die seat 3 and a top surface of the bottom die seat 4 are smooth joining surfaces that are able to be superimposed on top of each other. A top die recessed portion 30 into which a top portion of the core portion 5 is able to be fitted is formed in the bottom surface of the top die seat 3. A bottom die recessed portion 40 into which a bottom portion of the core portion 5 is able to be fitted is formed in the top surface of the bottom die seat 4. The bottom die recessed portion 40 is formed in a position opposite the top die recessed portion 30 when the top die seat 3 and the bottom die seat 4 are mutually superimposed, and a rectangular space which houses the core portion 5 (i.e., a core portion housing space 20) is formed by this bottom die recessed portion 40 and the aforementioned top die recessed portion 30. In addition, a trench-shaped molten material inflow aperture 41 that enables molten metal material from outside the metal die 2 to flow in is formed in the top surface of the bottom die seat 4. This molten material inflow aperture 41 extends from a side surface of the bottom die seat 4 to the bottom die recessed portion 40, and one end of the molten material inflow aperture 41 is open to the outside of the metal die 2 at the side surface of the bottom die seat 4, while the other end of the molten material inflow aperture 41 is open to the interior of the bottom die recessed portion 40.

As is shown in FIG. 2 through FIG. 4, the core portion 5 is a metal die core that is housed in the aforementioned core portion housing space 20, and a hollow cavity that is filled by the molten metal material is formed inside the core portion 5. The core portion 5 also has a separable structure. The fundamental structure of the core portion 5 is made up of a top die core 6, a bottom die core 7, an incident side protective component 8, and an emission side protective component 9.

The top die core 6 and the bottom die core 7 are block-shaped steel components that are able to be vertically superimposed, and a bottom surface of the top die core 6 and a top surface of the bottom die core 7 are smooth joining surfaces that are able to be superimposed on top of each other.

The top die core 6 is a rectangular block-shaped component that fits inside the top die recessed portion 30 of the top die seat 3, and a top die molding recessed portion 60 that molds an outer circumferential surface of the lens case 11, and a top die engaging recessed portion 61 that engages with a base end portion of the emission side protective component 9 are both formed in the bottom surface of the top die core 6.

The top die molding recessed portion 60 is a groove component having a semicircular cross-section, and extends from a side surface on the distal end side of the top die core 6 to an intermediate portion of the top die core 6.

The top die engaging portion 61 is a groove portion having a semicircular cross-section whose diameter is narrower than that of the top die molding recessed portion 60, and extends along a protracted axis of the top die molding recessed portion 60. More specifically, the top die engaging recessed portion 61 extends from an end surface on the base end side of the top die molding recessed portion 60 to the side surface on the base end side of the top die core 6. A distal end of the top die engaging recessed portion 61 is open to the interior of the top die molding recessed portion 60, while a base end of the top die engaging recessed portion 61 is closed off.

The top die core 7 is a rectangular block-shaped component that fits inside the bottom die recessed portion 40 of the bottom die seat 4, and a bottom die molding recessed portion 70 that molds an outer circumferential surface of the lens case 11, and a bottom die engaging recessed portion 71 that engages with the base end portion of the emission side protective component 9 are both formed in the top surface of the bottom die core 7.

The bottom die molding recessed portion 70 is a semicircular groove portion when viewed in cross-section, and extends from a side surface on the distal end side of the bottom die core 7 to an intermediate portion of the bottom die core 7. This bottom die molding recessed portion 70 is formed in a position opposite the top die molding recessed portion 60 when the top die core 6 and the bottom die core 7 are mutually superimposed, and a circular column-shaped molding surface that molds the outer circumferential surface of the lens case 11 is formed by this bottom die molding recessed portion 70 and the aforementioned top die molding recessed portion 60. In addition, the lens 10 is disposed in a distal end portion of a space (i.e. an internal space 21) that is formed by the bottom die molding recessed portion 70 and the aforementioned top die molding recessed portion 60. Note that, at this time, a gap (i.e., a hollow cavity) that is filled with molten metal material is formed extending around the entire circumference of the internal space 21 between an outer circumferential surface 10c of the lens 10 and an inner circumferential surface of the internal space 21.

The bottom die engaging portion 71 is a groove portion having a semicircular cross-section whose diameter is narrower than that of the bottom die molding recessed portion 70, and extends along a protracted axis of the bottom die molding recessed portion 70. More specifically, the bottom die engaging recessed portion 71 extends from an end surface on the base end side of the bottom die molding recessed portion 70 to the side surface on the base end side of the bottom die core 7. A distal end of the bottom die engaging recessed portion 71 is open to the interior of the bottom die molding recessed portion 70, while a base end of the bottom die engaging recessed portion 71 is closed off. This bottom die engaging recessed portion 71 is formed in a position opposite the top die engaging recessed portion 61 when the top die core 6 and the bottom die core 7 are mutually superimposed, and a round hole-shaped space (i.e., a holding space 22) that holds the base end portion of the emission side protective component 9 is formed by the bottom die engaging portion 71 and the top die engaging portion 61.

In addition, a concave trench-shaped molten material inflow aperture 72 that enables molten metal material which has flowed in from the molten material inflow aperture 41 of the bottom die seat 4 to flow into the internal space 21 is formed in the top surface of the bottom die core 7. This molten material inflow aperture 72 extends from a side surface of the bottom die core 7 to the bottom die molding recessed portion 70, and one end of the molten material inflow aperture 72 communicates with the molten material inflow aperture 41 of the bottom die seat 4, while the other end of the molten material inflow aperture 72 is open to the interior of the bottom die molding recessed portion 70.

The incident side protective component 8 is a component that protects an optical surface (i.e., an incident surface 10a) on the incident side (i.e., the distal end side) of the lens 10 which is located on the inner side of the metal die 2 (i.e., in the internal space 21), and is a rectangular plate-shaped component that abuts against the incident surface 10a. More specifically, the incident side protective component 8 is fixed to the top die core 6 and the bottom die core 7 by means of pins or the like (not shown), and is fitted onto the distal end portion of the core portion housing space 20 so as to be positioned vertically relative to the bottom surface (i.e., the joining surface) of the top die core 6 and the top surface (i.e., the joining surface) of the bottom die core 7. When this incident side protective component 8 is placed against the distal end surface of the mutually superimposed top die core 6 and bottom die core 7, a distal end of the internal space 21 is closed off by the incident side protective component 8.

The incident side protective component 8 is shaped such that it abuts against the incident surface 10a of the lens 10 so as to protect the incident surface 10a, and such that it also abuts against a portion of the outer circumferential surface 10c of the lens 10 so as to protect this portion of the outer circumferential surface 10c. More specifically, a circular lens engaging recessed portion 80, into which is fitted the distal end portion of the lens 10, is formed in the surface of the incident side protective component 8 on the base end side thereof (i.e., the surface that abuts against the top die core 6 and the bottom die core 7). The incident surface 10a of the lens 10 is placed against a bottom surface 80a (i.e., the distal end surface) of this lens engaging recessed portion 80, and the outer circumferential surface 10c of the distal end portion of the lens 10 is placed against an inner circumferential surface 80b of the lens engaging recessed portion 80.

The emission side protective component 9 is a component that protects the optical surface (i.e., an emission surface 10b) on the emission side (i.e., the base end side) of the lens 10 which is located on the inner side of the metal mold 2 (i.e., in the internal space 21), and is a circular column-shaped component whose distal end surface abuts against the emission surface 10b. More specifically, the emission side protective component 9 is a circular column-shaped component having substantially the same diameter (for example, having a diameter of 2.5 mm and a length of 60 mm) as a lens 10 that has a predetermined shape (for example, an optical function surface diameter of 2.2 mm and an outer diameter of 2.5 mm). The emission side protective component 9 is supported by the base end portion thereof being engaged with the inside of the holding space 22, and a distal end portion thereof is placed in the internal space 21 such that it protrudes towards the distal end side from the holding space 22. The emission side protective component 9 has a narrower diameter than the internal space 21, and a gap (i.e., a hollow cavity) that becomes filled with molten metal material is formed between the outer circumferential surface of the distal end portion of the emission side protective component 9 and the inner circumferential surface of the internal space 21 extending around the entire periphery of the internal space 21.

The above-described metal mold 2 (i.e., the top die seat 3, the bottom die seat 4, the top die core 6, the bottom die core 7, the incident side protective component 8, and the emission side protective component 9) is formed from tool steel (i.e., die steel) that has superior hardness and wear resistance, for example, from cold-work die steel (SKD 11). The coefficient of thermal expansion of the incident side protective component 8 and the emission side protective component 9 is desirably the same as or greater than the coefficient of thermal expansion of the above-described amorphous alloy (i.e., the Zr-based alloy). The coefficient of thermal expansion of the incident side protective component 8 and the emission side protective component 9 which are formed from the aforementioned cold-work die steel is $12.2 \times 10^{-6}$/K.

Next, a method of manufacturing the above-described endoscope optical component 1 will be described.

Firstly, a step is performed to prepare a molten metal material.

More specifically, a metal material is heated until it melts so as to prepare a molten material. A Zr-based alloy is used for the metal material described here, however, it is preferable for the metal material to satisfy the following three conditions: (1) that three or more types of metallic element be included; (2) that the three or more different types of metallic element have atomic diameters that differ by 12% or more. For example, that metallic elements of three different sizes, namely, small, medium, and large have atomic diameters that are mutually different from each other by 12% or more; and (3) that each metallic element can easily form a chemical compound. Namely, that each of the metallic elements has a nature that enables them to mutually attract each other.

If the metal material satisfies the conditions (1) to (3), then a molded article formed from an amorphous alloy (i.e., a metallic glass) having a glass transition region of 20° C. or more can be obtained.

If a metal material that forms an amorphous alloy whose glass transition region is less than 20° C. is used, then in the step to rapidly cool the molten metal material (described below), cooling unevenness occurs in the molten material so that the molten material tends to become easily crystallized and it becomes difficult to obtain a uniformly amorphous molded article.

A step to assemble the metal die 2 is also performed.

More specifically, firstly, the top die core 6 and the bottom die core 7 are mutually superimposed so as to form the core portion 5.

At this time, the incident side protective component 8 is fixed to the distal end surfaces of the mutually superimposed top die core 6 and bottom die core 7. In addition, the lens 10 is placed in the internal space 21 which is formed by the top die molding recessed portion 60 and the bottom die molding recessed portion 70. Moreover, the distal end portion of the lens 10 is fitted inside the lens engaging recessed portion 80 of the incident side protective component 8, and incident surface 10a of the lens 10 is placed against the bottom surface 80a of the lens engaging recessed portion 80. In addition, the outer circumferential surface 10c of the lens 10 is placed against the inner circumferential surface 80b of the lens engaging recessed portion 80. Moreover, the base end portion of the emission side protective component 9 is fitted in the internal space 22 which is formed by the top die engaging recessed portion 61 and the bottom die engaging recessed portion 71, and the distal end portion of the emission side protective component 9 is placed inside the internal space 21. In addition, the distal end surface of the emission side protective component 9 is placed against the emission surface 10b of the lens 10. As a result, gaps are formed respectively between the inner circumferential surface of the internal space 21 and the outer circumferential surface of the emission side protective component 9 and between the inner circumferential surface of the internal space 21 and the outer circumferential surface 10c of the lens 10. In addition to this, the incident surface 10a of the lens 10 and the outer circumferential surface 10c of the distal end portion of the lens 10 are each protected by the incident side protective component 8, while the emission surface 10b of the lens 10 is protected by the distal end surface of the emission side protective component 9.

Next, the top die seat 3 and the bottom die seat 4 are mutually superimposed, and the assembled core portion 5 is housed inside the core portion housing space 20 which is formed by the top die recessed portion 30 and the bottom die recessed portion 40.

Next, a step in which the internal space 21 inside the assembled metal die 2 is filled with the molten metal material so as to injection mold the lens case 11 integrally with the lens 10 is performed.

More specifically, the metal die 2 is placed in an injection molding machine (not shown) and is controlled so as to be at a predetermined temperature (for example, 25° C.). In addition, the molten metal material is made to flow through the molten material inflow aperture 41 and is poured into the internal space 21 via the molten material inflow aperture 72. The molten material which has been poured into the internal space 21 is made to fill the gaps which are formed respectively between the inner circumferential surface of the internal space 21 and the outer circumferential surface of the emission side protective component 9 and between the inner circumferential surface of the internal space 21 and the outer circumferential surface 10c of the lens 10. At this time, because the incident surface 10a and the emission surface 10b, which form the optical function surfaces of the lens 10, are protected respectively by the incident side protective component 8a and the emission side protective component 9, the molten material does not come into contact with the incident surface 10a and the emission surface 10b. Note that a commonly known injection molding machine can be used for the aforementioned injection molding machine.

Next, the molten material with which the interior of the metal die 2 has been filled is rapidly cooled so that the molten material is solidified in an amorphous state and becomes metallic glass (i.e., an amorphous alloy). Namely, the heat of the molten material filling the interior of the metal die 2 is captured by the top die core 6, the bottom die core 7, the incident side protective component 8, the emission side protective component 9, and the lens 10 which are in contact with the molten material, thereby rapidly cooling the molten material. In contrast, the temperature of the top die core 6, the bottom die core 7, the incident side protective component 8, the emission side protective component 9, and the lens 10 which have absorbed the heat of the molten material rises. At this time, the heat imparted from the molten material to the lens 10 is discharged to the incident side protective component 8 which is placed against the incident surface 10a and the emission side protective component 9 which is placed against the emission surface 10b. In addition, the heat discharged to the incident side protective component 8 escapes to the top die seat 3 and the bottom die seat 4, while the heat that is discharged to the emission side protective component 9 escapes via the top die core 6 and the bottom die core 7 to the top die seat 3 and the bottom die seat 4. As a result, any rise in the temperature of the lens 10 is suppressed, and the occurrence of residual stress as well as any deformation of the lens 10 are inhibited. In particular, in the above-described embodiment, because the outer circumferential surface 10c of the distal end portion of the lens 10 is protected by the incident side protective component 8, the surface area of the portion of the outer circumferential surface 10c of the lens 10 that makes contact with the molten material is reduced. Consequently, the amount of heat transmitted from the molten material to the lens 10 is reduced, and any rise in the temperature of the lens 10 is suppressed even further so that the occurrence of residual stress as well as any deformation of the lens 10 are even more inhibited.

As is described above, as a result of the molten metal material being rapidly cooled, it forms an amorphous solid body enabling a lens case 11 that is formed from metallic glass (i.e., an amorphous alloy) to be obtained.

Note that because the metal die 2 is formed having a volume that gives it sufficient heat capacity to capture heat from the molten material, there is only a slight rise in the temperature of the metal die 2 as a whole. Moreover, if the speed at which the molten material is cooled is too slow, recrystallization of the solid occurs, and it becomes difficult to obtain a uniform amorphous structure. As a consequence, it is desirable that the cooling speed of the molten material with which the interior of the metal die 2 has been filled is not less than 10° C./sec.

Next, a step to open up the metal die 2 and extract the endoscope optical component 1 is performed.

As a result of the above processing, an endoscope optical component 1 in which the lens 10 and the lens case 11 are formed as a single unit is obtained.

Note that the shape of the outer circumferential surface of the molded lens case 11 is formed by the top die molding recessed portion 60 and the bottom die molding recessed portion 70, and the shape of the outer circumferential surface of the lens case 11 is formed by the outer circumferential surface of the distal end portion of the emission side protective component 9.

According to the method of manufacturing the endoscope optical component 1 having the above-described structure, by placing the lens 10 inside the metal die 2 and insert-molding the lens case 11, the molding (i.e., the shape formation) of the lens case 11 as well as the fixing of the lens 10 to this lens case 11 are performed simultaneously. As a result, it is possible to improve the productivity of the endoscope optical component 1.

Moreover, because the lens case 11 is formed from an amorphous alloy (i.e., metallic glass) having a low Young's modulus and a high degree of strength, the lens case 11 is able to exhibit mechanically superior strength and durability.

Moreover, because the amorphous alloy (i.e., the metallic glass) can be injection molded and does not generate the type of solidification shrinkage generated by a crystalline metal, it exhibits superior transferability from a molding metal die during the injection molding. Accordingly, the lens case 11 that is formed from an amorphous alloy (i.e., metallic glass) molded by injection molding is able to achieve superior dimensional accuracy, and makes it possible for the shape stability of the endoscope optical component 1 to be improved. Note that by molding the lens case 11 using a Zr alloy that, even among metallic glass varieties, exhibits particularly superior injection molding properties, it becomes possible to obtain particularly superior dimensional accuracy and shape stability.

Furthermore, because any deformation and residual stress in the lens 10 when the lens 10 is placed inside the metal mold 2 and the lens case 11 is insert-molded can be suppressed, it is possible for the optical characteristics of the lens 10 to be maintained, and also for any breakage of the lens 10 to be prevented.

In particular, in the above-described embodiment, because the outer circumferential surface 10c of the distal end portion of the lens 10 is protected by the incident side protective component 8 so that the occurrence of deformation and residual stress in the lens 10 can be more reliably suppressed, it is possible for the optical characteristics of the lens 10 to be even more reliably maintained, and also for any breakage of the lens 10 to be even more reliably prevented.

Second Embodiment

Next, a second embodiment of the present invention will be described based on FIG. 5.

FIG. 5 is a vertical cross-sectional view showing an enlargement of the core portion 5 of the metal die 2.

Note that structure that is the same as in the above-described first embodiment is given the same symbols and a description thereof is omitted.

As is shown in FIG. 5, a portion of the inner circumferential surface of the metal die 2 that faces the outer circumferential surface 10c of the lens 10 has a narrowed diameter. Namely, the portion of the inner circumferential surface of the metal die 2 that faces the outer circumferential surface 10c of the lens 10 has a smaller cross-sectional area than other portions thereof. More specifically, tapering narrow-diameter portions 60a and 70a whose diameter gradually narrows moving towards the distal end side are fowled at a distal end portion of the top die molding recessed portion 60 of the top die core 6 and at a distal end portion of the bottom die molding recessed portion 70 of the bottom die core 7, and portions of the lens case 11 that hold the lens 10 are formed thinner than the hollow cavity portion of the lens case 11.

As a result, because the volume of the molten material filling the outer circumference of the lens 10 (i.e., the distal end portion of the lens case 11 that holds the lens 10) is reduced, the amount of heat that is transmitted to the lens 10 from the molten material filling the internal space 21 is reduced, so that any temperature increase in the lens 10 is further suppressed, and the occurrence of deformation and residual stress in the lens 10 can be more reliably suppressed. Accordingly, it is possible for the optical characteristics of the lens 10 to be even more reliably maintained, and also for any breakage of the lens 10 to be even more reliably prevented.

Note that in the present embodiment, the portion of the inner circumferential surface of the metal die 2 that faces the outer circumferential surface 10c of the lens 10 has a tapered shape, however, in the present invention, provided that the cross-sectional area of the portion that faces the outer circumferential surface 10c of the lens 10 is reduced, then it is also possible, for example, for the portion of the inner circumferential surface of the metal die 2 that faces the outer circumferential surface 10*c* of the lens 10 to be formed in a straight-cylinder shape that has a narrower diameter than other portions.

Third Embodiment

Next, a third embodiment of the present invention will be described based on FIG. 6.

FIG. 6 is a vertical cross-sectional view showing an enlargement of the core portion 5 of the metal die 2.

Note that structure that is the same as in the above-described first embodiment is given the same symbols and a description thereof is omitted.

As is shown in FIG. 6, the emission side protective component 9 is shaped such that it abuts against the emission surface 10*b* of the lens 10 so as to protect the emission surface 10*b*, and such that it also abuts against a portion of the outer circumferential surface 10*c* of the lens 10 so as to protect a portion of the outer circumferential surface 10*c*. More specifically, the emission side protective component 9 is formed having a larger diameter than the external diameter of the lens 10, and a circular lens engaging recessed portion 90, into which is fitted the base end portion of the lens 10, is formed in the distal end surface of the emission side protective component 9. The emission surface 10*b* of the lens 10 is placed against a bottom surface 90*a* (i.e., the distal end surface) of this lens engaging recessed portion 90, and the outer circumferential surface 10*c* of the base end portion of the lens 10 is placed against an inner circumferential surface 90*b* of the lens engaging recessed portion 90.

As a result of this, the surface area of the portion of the outer circumferential surface 10*c* of the lens 10 that makes contact with the molten material is reduced. Consequently, the amount of heat transmitted from the molten material to the lens 10 is reduced, and any rise in the temperature of the lens 10 is suppressed even further so that the occurrence of residual stress as well as any deformation of the lens 10 are even more inhibited. As a result, it is possible for the optical characteristics of the lens 10 to be even more reliably maintained, and also for any breakage of the lens 10 to be even more reliably prevented.

Embodiments of the method of manufacturing an optical component for an endoscope according to the present invention are described above, however, the present invention is not limited to the above-described embodiments and various modifications and the like may be made insofar as they do not depart from the spirit or scope of the present invention.

For example, in the above-described embodiments, a structure is employed in which the lens engaging recessed portion 80 is formed in the incident side protective component 8, and the incident surface 10*a* of the lens 10 and the outer circumferential surface 10*c* of the distal end portion of the lens 10 are protected by the incident side protective component 8, however, in the present invention, it is also possible to employ a structure in which the lens engaging recessed portion 80 is not formed in the incident side protective component 8, and the incident side protective component 8 only protects the incident surface 10*a* of the lens 10.

Moreover, in the above described embodiments, the metal die 2 is formed by the top die seat 3, the bottom die seat 4, the top die core 6, the bottom die core 7, the incident side protective component 8, and the emission side protective component 9, each of which can be separated from the other components, however, in the present invention, the structure of the metal die 2 can be modified as is appropriate. For example, instead of a structure that vertically divides into two pieces, it is also possible to use a metal die that divides into three or more pieces. Moreover, a structure in which the incident side protective component 8 and the emission side protective component 9 divide into a plurality of pieces may be employed, or a structure in which the incident side protective component 8 and the emission side protective component 9 are formed integrally with at least one of the top die core 6 and the bottom die core 7.

Moreover, in the above-described embodiment, the incident side protective component 8 is formed in a flat plate shape, and the emission side protective component 9 is formed in a circular column shape, however, the shapes of the incident side protective component and the emission side protective component may be modified as is appropriate. For example, the incident side protective component may be formed in a rod shape (i.e., a columnar shape), and the emission side protective component may be formed in a plate shape. Alternatively, both the incident side protective component and the emission side protective component may be formed in either a rod shape (i.e., a columnar shape) or a flat plate shape. It is also possible for an incident side protective component and an emission side protective component having shapes other than these to be used.

Furthermore, in the above described embodiments, the lens 10 is held at the distal end portion of the lens case 11, however, in the present invention it is also possible for the lens 10 to be held at the base end portion (i.e., the end portion on the emission side) of the lens case 11, or for the lens 10 to be held in an intermediate portion in the axial direction of the lens case 11.

Moreover, in the above described embodiments, a lens case 11 having a circular cylinder shape is illustrated as an example of an optical element holding component, however, the shape of the optical element holding component of the present invention may be modified as is appropriate. For example, a structure may be employed in which the optical element holding component is formed by a plate-shaped component in which an aperture is formed, and the optical element (i.e., the lens 10) is mounted in this aperture.

Furthermore, the optical element holding component of the present invention is not limited to the above described lens case 11, and may be another component such as, for example, a spacer tube.

Moreover, the optical element of the present invention is not limited to the lens 10, and may be another component such as, for example, a prism, a filter, flat glass, or a polarizing plate.

While preferred embodiments of the present invention have been described and illustrated above, it should be understood that these are exemplary of the present invention and are not to be considered as limiting. Additions, omissions, substitutions, and other modifications can be made without departing from the spirit or scope of the present invention. Accordingly, the present invention is not to be considered as limited by the foregoing description and is only limited by the scope of the appended claims.

What is claimed is:

1. A method of manufacturing an optical component provided with an optical element and an optical element holding component that holds an outer circumferential portion of the optical element, comprising:

placing the optical element on an interior side of a metal die that molds the optical element holding component, placing an incident side protective component that protects an optical surface on an incident side of the optical element against the optical surface on the incident side, placing an emission side protective component that protects an optical surface on an emission side of the optical element against the optical surface on the emission side, and placing at least one of the incident side protective component and the emission side protective component against a part of an outer circumferential surface of the optical element;

filling the interior of the metal die with a molten metal material and cooling the molten material until solidified in an amorphous state and an amorphous alloy is made, and in which the optical element holding component is injection molded integrally with the optical element to have a hollow portion therein, thereby forming the optical component;

wherein a first portion of the inner circumferential surface of the metal die that faces the outer circumferential surface of the optical element has a narrower diameter than a second portion of the inner circumferential surface of the metal die that faces the outer circumferential surface of the emission side protective component; and a wall thickness of a portion of the optical element holding component that holds the optical element is formed smaller than a wall thickness of the hollow portion of the optical element holding component molded around the emission side protective component.

2. The method of manufacturing an optical component according to claim 1, wherein the first portion is formed having a tapered shape such that the diameter of the first portion gradually narrows towards a distal end of the metal die.

3. The method of manufacturing an optical component according to claim 1, wherein the incident side protective component and the emission side protective component is placed against the optical surface of the optical element so as to protect the optical surface, and is also placed against a portion of the outer circumferential surface of the optical element so as to protect the portion of the outer circumferential surface of the optical element.

* * * * *